United States Patent
Matsumoto et al.

(10) Patent No.: US 6,716,952 B1
(45) Date of Patent: Apr. 6, 2004

(54) FLAME RETARDANT AND FLAME-RETARDANT RESIN COMPOSITION CONTAINING THE SAME

(75) Inventors: Kazuaki Matsumoto, Yao (JP); Yoshitaka Ono, Settsu (JP); Hiroshi Tsuneishi, Kobe (JP)

(73) Assignee: Kaneka Corporation, Osaka (JP)

( * ) Notice: Subject to any disclaimer, the term of this patent is extended or adjusted under 35 U.S.C. 154(b) by 412 days.

(21) Appl. No.: 09/807,440

(22) PCT Filed: Aug. 24, 2000

(86) PCT No.: PCT/JP00/05658

§ 371 (c)(1),
(2), (4) Date: Jun. 15, 2001

(87) PCT Pub. No.: WO01/14499

PCT Pub. Date: Mar. 1, 2001

(30) Foreign Application Priority Data

Aug. 24, 1999 (JP) ............................................ 11/237497
Oct. 26, 1999 (JP) ............................................ 11/304446
Nov. 26, 1999 (JP) ............................................ 11/336569

(51) Int. Cl.$^7$ ............................ C08G 77/00; C08F 8/00
(52) U.S. Cl. ........................ 528/10; 525/101; 525/389
(58) Field of Search ................................ 525/101, 389; 528/10

(56) References Cited

U.S. PATENT DOCUMENTS 3,855,171 A * 12/1974 Wegehaupt et al. ......... 524/857
4,851,491 A * 7/1989 Riccitiello et al. ............. 528/4
4,929,507 A * 5/1990 Nishihara et al. ........... 428/447
5,204,431 A * 4/1993 Sartori et al. .................. 528/4

OTHER PUBLICATIONS

Marosi, Gy, et al., "Thermoanalytical Study of Nucleating Effects in Polypropylene Composites," Journal of Thermal Analysis, vol. 48, pp. 717–726 (1997).
Yajima, Seishi, et al., "Pyrolysis of a Polyborodiphenylsiloxane," Nature, vol. 266, No. 7, pp. 521–522 (Apr. 1997).
O'Dowd, Anna, et al., "Synthesis and Crystal Structure of the Novel Borosilicate Cage Compound [B(OSiPh$_2$OSiPh$_2$O)$_3$B]," J. Chem. Soc., Chem. Commun., pp. 1816–1817 (1993).
Beckett, Michael, et al., "Crystal Structure of tris(triphenylsiloxy)borane–triphenylsilanol (1:1) adduct," Journal of Chemical Crystallography, vol. 28, No. 4, pp. 277–281 (1998).
Beckett, Michael, et al., "Synthesis and Lewis Acidity of Triorganosilyl and Triorganostannyl Esters of Orthoboric, Metaboric, and Arylboronic Acids," Journal of Organometallic Chemistry, vol. 588, pp. 107–112 (1999).

* cited by examiner

Primary Examiner—Kriellion A. Sanders
(74) Attorney, Agent, or Firm—Westerman, Hattori, Daniels & Adrian, LLP

(57) ABSTRACT

This invention provides a flame retardant which is inexpensive, has a high level flame retardant effect and is substantially free of such atoms as halogen, phosphorus and nitrogen.

A flame retardant which comprises a polymer comprising silicon, boron and oxygen, having a skeleton substantially formed by a silicon-oxygen bond and a boron-oxygen bond and having an aromatic ring within the molecule. A flame retardant resin composition which contains 100 parts by weight of a resin and 0.1 to 50 parts by weight of the above flame retardant.

12 Claims, No Drawings

FLAME RETARDANT AND FLAME-RETARDANT RESIN COMPOSITION CONTAINING THE SAME

TECHNICAL FIELD

The present invention relates to a novel flame retardant which is substantially free of such atoms as halogen, phosphorus and nitrogen and yet exhibits high level flame retardant properties and to a highly flame-retardant resin composition formulated using the above flame retardant without employing bromine-, chlorine-, phosphorus- or like containing compounds.

BACKGROUND ART

Resins to be utilized industrially, for example in the electric and electronic fields, are often required to have high-level flame retardant properties qualifying them under UL-94 V-0 (U.S. Underwriters Laboratories standard) so that the safety from fire can be secured. Therefore, various flame retardants have been developed. In recent years, many investigations have been made on the use of halogen-free flame retardants, such as silicone-based flame retardants, reflecting the mounting interest in environmental problems, especially in Europe.

As for the resin compositions containing a silicone-based flame retardant, Japanese Kokoku Publication Sho-62-60421 discloses a resin composition comprising a thermoplastic non-silicone polymer and a polysiloxane resin containing not less than 80% by weight of T units represented by the formula $SiO_{3/2}$ (according to the description, it being preferred for rendering the polymer composition flame-retardant that the polysiloxane resin have a molecular weight of not less than 2,000 but not more than 6,000 and the phenyl group content be not more than 80%, with the methyl group content accounting for the balance). Further, Japanese Kokai Publication Hei-10-139964 discloses a flame-retardant resin composition comprising an aromatic ring-containing non-silicone resin and a silicone resin having units represented by the formula $SiO_{2/2}$ and units represented by the formula $SiO_{3/2}$ (with a weight average molecular weight of not less than 10,000 to not more than 270,000) incorporated therein. On the other hand, Japanese Kokai Publication Hei-10-316868 discloses a flame-retardant additive for aromatic-base polymers which comprises an aryl-containing silicone compound and a diorganopolysiloxane compound.

However, the prior art silicone-based flame retardants are low in flame retardant effect. Thus, when added to specific resins such as aromatic polycarbonate resins, they bring about a certain degree of flame retardance but, when added to resins other than aromatic polycarbonate resins, they produce little fire retardant effect, hence they are not suited for general use in resins. Additionally, they are relatively expensive, hence cannot be used in resins for general use for economical reasons.

In view of the current state of art as mentioned above, it is an object of the invention to provide a flame retardant which is inexpensive, has a high level flame retardant effect and is substantially free of such atoms as halogen, phosphorus and nitrogen, as well as a flame-retardant resin composition rendered flame-retardant using the same.

DISCLOSURE OF THE INVENTION

The present invention is concerned with a flame retardant which comprises a polymer comprising silicon, boron and oxygen, having a skeleton substantially formed by a silicon-oxygen bond and a boron-oxygen bond and having an aromatic ring within the molecule.

In another aspect, the invention is concerned with a flame-retardant resin composition comprising 100 parts by weight of a resin and 0.1 to 50 parts by-weight of the above flame retardant.

In the following, the invention is described in detail.

The flame retardant of the invention comprises a polymer comprising silicon, boron and oxygen and having a skeleton substantially formed by a silicon-oxygen bond and a boron-oxygen bond. Thus, a silicon-oxygen bond and a boron-oxygen bond account for not less than 80%, preferably not less than 90%, of the bonds forming the skeleton of the above polymer, and the polymer may additionally contain a silicon-silicon bond, a boron-boron bond, an oxygen-oxygen bond, a silicon-bivalent organic group bond, a boron-bivalent organic group bond and the like. In referring to the term "skeleton" as used in the present specification, the silicon- or boron-univalent organic group bonds are not taken into consideration, namely they are regarded as bonds other than the skeleton-constituting bonds.

Preferably, the above polymer has a skeleton resulting from connection of a silicon atom or a boron atom with another silicon atom and/or boron atom via an oxygen atom. In that case, the skeleton of the polymer substantially comprises Si—O—Si, Si—O—B, and B—O—B bonds. Thus, the skeleton of the above polymer may comprise Si—O—B bonds alone or may substantially comprise Si—O—B bonds and contain a slight proportion of Si—O—Si bonds and/or B—O—B bonds. The skeleton may also contain Si—O—Si, Si—O—B and B—O—B bonds at random. Further, the skeleton may substantially comprise Si—O—Si and B—O—B bonds and contain a slight proportion of Si—O—B bonds. In this case, the above polymer has a skeleton such that the molecule may be divided into a portion practically comprising silicon alone and a portion practically comprising boron alone. The skeleton of the polymer mentioned above may be a linear one or a three-dimensionally crosslinking one. From the flame retardancy viewpoint, however, the three-dimensionally crosslinking structure is preferred.

The polymer in the flame retardant of the invention (hereinafter also referred to as "flame retardant polymer") has an organic group(s) within the molecule. The term "organic group" as used herein means a uni- or polyvalent substituent composed of a carbon atom(s) together with any of a hydrogen atom, an oxygen atom, a nitrogen atom, a sulfur atom, a phosphorus atom, a halogen atom and like atoms. Typically, it is a hydrocarbon group, preferably containing 1 to 20 carbon atoms.

The flame retardant polymer of the invention more preferably has an aromatic ring among organic groups. This aromatic ring may be uni-, bi- or trivalent, for instance, but is preferably a univalent one in view of the ease of synthesis. The mode of bonding of the aromatic group within the molecule is arbitrary and, thus, the group may be bonded to a silicon atom and/or boron atom directly or bonded to a silicon atom and/or boron atom via a bivalent organic group such as a methylene or ethylene group (namely, the aromatic ring may be contained in the form of an aralkyl group such as benzyl group or phenylethyl group), for instance. For more improved flame retardancy, the aromatic ring within the molecule is preferably one directly bonded to a silicon atom. There is no particular restriction as to the method of introducing the aromatic ring into the molecule.

The term "aromatic ring" is used herein as a generic term for rings belonging to aromatics, without any particular restriction. As preferred aromatic rings, there may be mentioned phenyl, cresyl, xylenyl, naphthyl and anthracenyl. More preferred are univalent benzene- or condensed benzene-derived aromatic groups containing 6 to 20 carbon atoms, more preferably 6 to 10 carbon atoms. Further, the aromatic ring may be substituted by one or more of halogen, oxygen, nitrogen and other elements.

The flame retardant polymer of the invention may further have an organic group not containing the above-mentioned aromatic ring. The aromatic ring-free organic group may be uni-, bi- or trivalent, for instance. For reasons of ease of synthesis, a univalent one is preferred. As the aromatic ring-free organic group, there may be mentioned univalent straight or cyclic alkyl groups and, among them, ones containing 1 to 12 carbon atoms are suitable. For attaining better flame retardancy, alkyl groups containing a smaller number of carbon atoms, specifically 1 to 4 carbon atoms. A particularly preferred alkyl group is methyl group.

The proportion of the aromatic ring-containing organic group(s) in the total of the organic groups is not particularly restricted but, for obtaining better flame retardancy, it is preferred that the aromatic ring-containing organic group(s) account for not less than 10 mol %, more preferably not less than 30 mol %, still more preferably not less than 50 mol %.

Preferably, the silicon atoms in the flame retardant polymer are contained in at least one form selected from among $SiO_{4/2}$ units, $SiRO_{3/2}$ units, $SiR_2O_{2/2}$ units and $SiR_3O_{1/2}$ units (where R represents a univalent substituent capable of being bonded to a silicon atom, the plurality of R groups may be the same on or different and at least one of the plurality of R groups within the molecule is an aromatic ring-containing univalent organic group). As the univalent substituent capable of being bonded to a silicon atom, there may be mentioned those aromatic ring-containing and aromatic ring-free organic groups mentioned above as well as hydroxyl and alkoxyl groups and halogen atoms, among others. The aromatic ring-containing univalent organic group may be the univalent aromatic ring itself or an aromatic ring-containing univalent organic group.

There are no particular restrictions as to the proportions of these units. Preferable is not less than 10 mol % of $SiRO_{3/2}$ units, more preferable is not less than 30 mol %, still more preferable is not less than 50 mol %, based on the total number of silicon atoms. When the content of $SiRO_{3/2}$ units is less than 10 mol %, the resulting flame retardant resin composition may show an unsatisfactory level of flame retardancy in certain instances. Preferable is less than 50 mol % of $SiO_{4/2}$ units, more preferable is less than 30 mol %, still more preferable is less than 10 mol %, based on the total number of silicon atoms. When the content of $SiO_{4/2}$ units is in excess of 50 mol %, the resulting flame retardant resin composition tends to show reduced flame retardancy and/or reduced shock resistance. Further, preferable is less than 80 mol % of $SiR_2O_{2/2}$ units, more preferable is less than 50 mol %, still more preferable is less than 20 mol %, based on the total number of silicon atoms. When the content of $SiR_{2/2}$, units is in excess of 80 mol %, the resulting flame retardant resin composition tends to show reduced flame retardancy.

The boron atoms in the flame retardant polymer are preferably contained in at least one selected from among $BO_{3/2}$ units, $BR'O_{2/2}$ units and $BR'_2O_{1/2}$ units (where R' represents a univalent substituent capable of being bonded to a boron atom, the plurality of R' groups may be the same or different and at least one of the plurality of R' groups within the molecule is an aromatic ring-containing univalent organic group). As the univalent substituent capable of being bonded to a boron atom, there may be mentioned the aromatic ring-containing and aromatic ring-free organic groups mentioned above, hydroxyl, alkoxyl and halogen atoms, among others. Among the units mentioned above, the $BO_{3/2}$ units are preferred from the stability viewpoint.

The flame retardant polymer of the invention, when it is a three-dimensionally crosslinking polymer containing $SiRO_{3/2}$ units (R being as defined above) and $BO_{3/2}$ units in the skeleton thereof, shows more marked flame retardant properties, hence such polymer is preferred. In this case, it may contain silicon-containing units other than $SiRO_{3/2}$ units or boron-containing units other than $BO_{3/2}$ units. In particular, one containing $SiR_3O_{1/2}$ units (R being as defined above) in addition to $SiRO_{3/2}$ units and $BO_{3/2}$ units is more preferred.

The flame retardant polymer containing $SiRO_{3/2}$ units and $B_{3/2}$ units supposedly has the structure (1) shown below within the molecule.

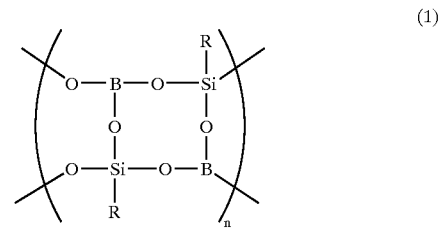

(1)

(In the formula, R is as defined above and n represents a number not smaller than 1.)

For the flame retardant polymer having $SiR_2O_{2/2}$ units, it is supposed that such a structure (2) as shown below is contained within the molecule.

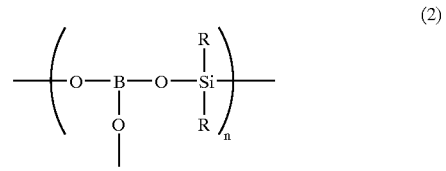

(2)

(In the formula, R is as defined above and n represents a number not smaller than 1.)

Further, the flame retardant polymer of the invention, when it is a three-dimensionally crosslinking polymer containing $SiR_3O_{1/2}$ units (R being as defined above) and $BO_{3/2}$ units in its skeletal structure, shows more marked flame retardancy, hence such polymer is preferred. In this case, it may contain other silicon-containing units than $SiR_3O_{1/2}$ units or other boron-containing units than $BO_{3/2}$ units.

The flame retardant polymer of the invention is preferably free of any crosslinking substituent. If it contains a crosslinking substituent, the crosslinking substituent-to-noncrosslinking substituent ratio (crosslinking substituent/noncrosslinking substituent) for the substituents on the silicon atoms and boron atoms in the polymer should preferably be less than ¼, more preferably less than ⅙, still more preferably less than 1/10. When the crosslinking substituent/noncrosslinking substituent ratio is not less than ¼, the flame retardancy may markedly lower in certain cases.

The term "crosslinking substituent (also referred to as active group)" as used herein means a univalent substituent on a silicon atom or a boron atom in the polymer which substituent is capable of undergoing a mutual condensation reaction with another one to form an intermolecular crosslink when the flame retardant polymer alone is heated at 300° C. As typical crosslinking substituents, there may be mentioned a hydroxyl group on a silicon atom, a chloro group on a silicon atom, a hydroxyl group on a boron atom, an alkoxyl group on a silicon atom, an alkoxyl group on a boron atom; a hydroxyl-, epoxy- or carboxyl-containing organic group on a silicon atom or a boron atom; and the like. Among these, a hydroxyl group on a silicon atom, a chloro group on a silicon atom, a hydroxyl group on a boron atom and an alkoxyl group on a silicon atom, among others, are crosslinking substituents which can possibly be contained in the molecular construction as defective and/or polymer terminal structures as formed in the process of production of the flame retardant polymer. The non-crosslinking substituent includes other substituents than the above-mentioned crosslinking substituents; it generally means a hydrocarbon group on a silicon atom or a boron atom.

The flame retardant polymer of the invention can be produced by any of those methods which are known in the art, for example by the methods described in Japanese Kokai Publication Sho-53-50299, Japanese Kokai Publication Sho-54-83100, Japanese Kokai Publication Sho-57-23629, Japanese Kokai Publication Sho-58-201821, etc.

Specifically, it can be synthesized by mixing at least one boron compound selected from among boric acid, boron oxide, boric acid metal salts, boron halides, boric acid esters and the like with at least one silicon compound represented by SiR"$X_3$ (in which R" represents a univalent organic group and X represents at least one member selected from halogen, a hydroxyl group and hydroxyl-derived dehydration condensation products (e.g. alkoxyl groups); the plurality of X groups may be the same or different from one another) in the presence or absence of a solvent, if necessary with heating. In this case, when a compound of the formula SiR"$X_3$ which has an aromatic ring as R" is used as part of the compound SiR"$X_3$, a three-dimensionally is crosslinked polymer containing SiRO$_{3/2}$ units (in which R represents a univalent substituent capable of being bonded to a silicon atom, the plurality of R groups may be the same or different and at least one of the plurality of R groups is an aromatic ring-containing univalent organic group) and BO$_{3/2}$ units can be obtained.

Further, it is possible to synthesize flame retardants having various characteristics by carrying out the reaction in the presence of one or more silicon compounds represented by SiX$_4$, SiR"$_2$X$_2$ and/or SiR"$_3$X (R" and X being as defined above) other than the compound represented by SiR"$X_3$ in admixture. In particular when an appropriate amount of a compound represented by SiR"$_3$X is used as the terminator for the synthetic reaction, a polymer having a desired molecular weight can be synthesized.

The content of the crosslinking substituent(s) in the polymer can be reduced by blocking the crosslinking substituents such as a hydroxyl group on a silicon atom, a chloro group on a silicon atom, a hydroxyl group on a boron atom and an alkoxyl group on a silicon atom using one or more monofunctional silicon compounds represented by SiR"$_3$X. Thus, one or more boron compounds and one or more silicon compounds represented by SiR"$X_3$ are mixed together and, after effecting the polymerization, one or more silicon compound represented by SiR"$_3$X are added and the reaction is allowed to proceed. In this case, SiX$_4$, SiR"$_2$X$_2$ and/or SiR"$_3$X may be added as the silicon compound in the first step in addition to the compound represented by SiR"$X_3$. The crosslinking substituent content can be reduced not only by this method but also by various methods.

The crosslinking substituentts) within the molecule may vary according to the starting material(s) used in the polymer production. When, for instance, a chlorosilane compound of the formula SiR"$X_3$ in which X is chlorine is used, however, a chloro group and a hydroxyl group remain on silicon atoms in high proportions and, when an alkoxysilane in which X is an alkoxyl group is used, the proportion of remaining an alkoxyl group and a hydroxyl group on silicon atoms becomes high. When boric acid is used as the boron source, the possibility of hydroxyl groups remaining on boron atoms is high.

In the case that phenyltrichlorosilane and boric acid, for instance, are used as the starting materials for the flame retardant polymer, it is expected that the structure (1) shown above will predominate when the reaction is carried out under substantially water-free conditions. However, when the reaction is carried out in the presence of a trace amount of water, a compound will presumably be produced in which the structure (3) shown below and other various structures additionally occur.

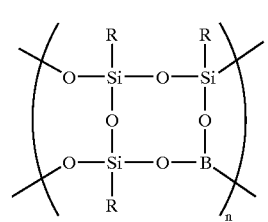

(3)

(In the formula, R is as defined above for the formula (1).)

The silicon atom-to-boron atom ratio in the flame retardant polymer of the invention is not particularly restricted but preferably is 100:1 to 1:4, more preferably 70:1 to 1:3, still more preferably 50:1 to 1:2, as expressed in terms of mole ratio. When the silicon atom proportion becomes greater, namely the silicon atom-to-boron atom ratio becomes higher than 100:1, the resulting flame retardant properties may not be sufficient in some instances. When the boron atom proportion becomes greater and the silicon atom-to-boron atom ratio becomes smaller than 1:4, the polymer obtained shows a tendency toward instability, such as greater susceptibility to hydrolysis.

The above ratio can be arbitrarily varied according to the starting material species, reaction conditions, and charge ratio, among others. Since the amount of the compound to be used for blocking crosslinking substituents depends on the molecular weight of the flame retardant polymer, it is possible to synthesize the polymer having a desired ratio with ease.

For increasing its affinity for resins or imparting various characteristics, the flame retardant polymer of the invention can be modified by copolymerizing various compounds or using various functional groups within the range not contrary to the object of the invention. The mode of copolymerization is not particularly restricted but there may be mentioned graft copolymers, block copolymers, random copolymers, copolymers substituted terminally alone, and so forth. The method of modifying with various functional groups is not particularly restricted, either, but includes the method comprising copolymerizing a functional group-containing compound and the method using various chemical reactions for modifications after the synthesis of the flame retardant polymer, among others. The compound to be copolymerized is not particularly restricted unless the purposes of the invention are missed. As examples of the compound to be copolymerized, there may be mentioned epoxy-containing compounds, vinyl-containing compounds, hydroxyl-containing compounds, carbonyl-containing compounds, carboxyl-containing compounds, alkoxyl-containing compounds, phenyl-containing compounds, amino-containing compounds, amido-containing compounds, imido-containing compounds, mercapto-containing compounds, nitrile-containing compounds, ether linkage-containing compounds, ester linkage-containing compounds and various high-molecular compounds, among others. In particular by copolymerizing a compound or macromolecule having a substituent having high affinity for resins to be added, it becomes possible to maintain various characteristics of the resulting flame retardant resin compositions.

The weight average molecular weight of the flame retardant polymer of the invention is not particularly restricted but preferably is not less than 1,000, more preferably not less than 1,200, most preferably not less than 1,500. The weight average molecular weight so referred to herein is the weight average molecular weight on the polystyrene equivalent basis as determined on a GPC apparatus using toluene as the solvent and U as the means of detection. When the weight average molecular weight is less than 1,000, the attainable flame retardancy may be insufficient. As for the upper limit to the molecular weight, a solvent-soluble molecular weight is preferred such that the solubility in toluene is not less than 1 g/100 ml when toluene is used as the solvent. When the solubility in toluene is less than 1 g/100 ml, the flame retardant remains undissolved in the solvent, so that the flame retardancy of the flame retardant resin composition markedly decreases and, in addition, the shock resistance of the moldings obtained or the moldability tends to decrease.

The shape or form in which the flame retardant of the invention is used is not particularly restricted but may be any arbitrary one, for example oily, gaseous, varnish-like, powder-like, glass-like or pellet-like. In using the flame retardant of the invention, one species alone may be used singly or two or more species may be used in combination. The combination of two or more species is not particularly restricted but species differing in polymer composition or mole ratio, species differing in molecular weight, and other different species can be used in arbitrary combination. The possibility is not excluded of incorporating other additives in the flame retardant of the invention within the range not contrary to the object of the invention.

When the flame retardant polymer of the invention is added in an amount of 0.1 to 50 parts by weight per 100 parts by weight of a resin, the intended objects can be achieved. At an addition amount below 0.1 part by weight, no flame retardancy improving effect is obtained as the case may be. At an amount above 50 parts by weight, the surface quality, moldability and/or other features tend to deteriorate. Preferably, the addition amount is 0.3 to 30 parts by weight, more preferably 0.5 to 20 parts by weight. Further, it is possible to obtain a higher level of flame retardancy by using the flame retardant of the invention combinedly with one or more of various other flame retardants known in the art and, in that case, the addition amount of the flame retardant of the invention is not limited to that mentioned above but the addition thereof in a smaller amount can give a flame retardant composition. When the flame retardant of the invention contains another additive or other additives, the amount of the flame retardant polymer should fall within the range mentioned above.

The resin to be used in the flame retardant resin composition of the invention is not particularly restricted but there can be used any of various high-molecular compounds with which the flame retardant can be blended. The resin may be a thermoplastic resin or a thermosetting resin. It may be a synthetic resin or a naturally occurring resin. In cases where it is difficult to achieve a satisfactory level of flame retardancy using the flame retardant of the invention singly, a higher level of flame retardancy can be produced by combined use of various other flame retardants known in the art.

Among resins, aromatic resins are preferably used as the resin since they can be readily rendered flame retardant according to the present invention. "Aromatic resins" mean resins containing at least one aromatic ring within the molecule.

Preferably used among aromatic resins is at least one selected from the group consisting of aromatic polycarbonate resins, aromatic polyester resins, polyphenylene ether resins, aromatic vinyl resins, polyphenylene sulfide resins, N-aromatic substituted maleimide resins and aromatic polyimide resins. These resins may be used singly or in the form of alloys with various other resins.

For further increasing the moldability/fluidity and/or improving the flame retardancy, it is possible to incorporate a silicone or the like other than the flame retardant polymer of the invention within the limits within which the characteristic features (flame retardant properties etc.) are not sacrificed.

The silicone other than the flame retardant polymer of the invention is a polyorganosiloxane in a broad sense, exclusive of the flame retardant polymer of the invention, and specifically includes (poly)diorganosiloxane compounds such as dimethylsiloxane and phenylmethylsiloxane; (poly)organosilsesquioxane such as methylsilsesquioxane and phenylsilsesquioxane; (poly)triorganosilhemioxane compounds such as trimethylsilhemioxane and triphenylsilhemioxane; copolymers obtained by polymerization of these; polydimethylsiloxane, polyphenylmethylsiloxane and the like. In the case of polyorganosiloxanes, modified silicones derived therefrom by substitution at molecular termini by epoxy, hydroxyl, carboxyl, mercapto, amino, ether and like groups. The form of the silicone is not particularly restricted but the silicone may be utilized in any arbitrary form, for example in an oily, gummy, varnish-like, powdery or pellet-like form.

Further, the flame retardant resin composition of the invention may be made into a reinforcing material by combining the same with a reinforcing filler within the limits within which the characteristic features (flame retardant properties etc.) are not impaired. Thus, by adding a reinforcing filler, further improvements in heat resistance, mechanical strength and so on can be attempted. Such reinforcing filler is not particularly restricted but includes, among others, fibrous fillers such as glass fiber, carbon fiber and potassium titanate fiber; glass beads, glass flakes; silicate compounds such as talc, mica, kaolin, wollastonite, smectite and diatomaceous earth; calcium carbonate, calcium sulfate, barium sulfate, etc. Among them, silicate compounds and fibrous fillers are preferred.

For providing the flame retardant resin composition of the invention with higher performance characteristics, one alone or a combination of two or more of antioxidants such as phenolic antioxidants and thioether antioxidants; heat stabilizers such as phosphorus-containing stabilizers; and the like is preferably used. Further, if necessary, use may also be made of one alone or a combination of two or more of those additives generally well known in the art, such as lubricants, mold release agents, plasticizers, flame retardants such as phosphorus compounds, flame retardant auxiliaries, antidrip agents, ultraviolet absorbers, light stabilizers, pigments, dyes, antistatic agents, conductivity providing agents, dispersants, compatibilizers, antimicrobial agents and so on.

The method of producing the flame retardant resin composition of the invention is particularly restricted. It can be produced, for example, by drying such components as mentioned above, if necessary, then melting and kneading them in a melt-kneader such as a single-screw, twin-screw or like extruder. When a compounding additive is a liquid, it is also possible to produce the composition while feeding the additive midway to a twin-screw extruder using a liquid feeding pump or the like.

The method of molding the flame retardant resin composition of the invention is not particularly restricted but those methods of molding in general use can be utilized, for example injection molding, blow molding, extrusion molding, vacuum molding, press molding, calender molding and expansion molding.

The flame retardant resin composition of the invention can judiciously be used in various fields. As preferred fields of application, there may be mentioned injection-molded articles, blow-molded articles, extrusion-molded articles, expansion-molded articles and the like, such as parts for household electric and electronic appliances, OA equipments, automobiles and so forth.

BEST MODES FOR CARRYING OUT THE INVENTION

The following examples illustrate the present invention in more detail. They are, however, by no means limitative of the scope of the invention. In the following, unless otherwise specified, "part(s)" and "%" mean "part(s) by weight" and "% by weight", respectively.

PRODUCTION EXAMPLE 1

Production of Flame Retardant (S-1) to be Added to Resins

Phenyltrichlorosilane (342.7 g, 1.62 mol) was added dropwise to a pyridine solution (1 L) containing boric acid (100 g, 1.62 mol) with ice cooling and, after completion of the dripping and after disappearance of powdery boric acid, the mixture was heated and the reaction was allowed to proceed under reflux for 5 hours. Then, trimethylchlorosilane (176 g, 1.62 mol) was added, and the reaction was further allowed to proceed under reflux for 1 hour. Water was then added in excess, the reaction was allowed to proceed under reflux further for 1 hour and the reaction was then completed. The reaction mixture was neutralized with 2 N hydrochloric acid and extracted with diethyl ether (500 mL). The solution obtained was dried over anhydrous sodium sulfate, and the solvent was distilled off under vacuum to give a compound. As a result of GPC analysis, the weight average molecular weight was found to be 3,000 (on the polystyrene equivalent basis; UV detector; solvent: toluene). Upon IR analysis, the compound obtained showed a B—O bond-due peak at about 1360 $cm^{-1}$ and a Si—Ph bond-due peak at about 1430 $cm^{-1}$. NMR analysis revealed a $Me_3$—Si—$O_{1/2}$ bond content of 17 mol % and a Ph—Si—$O_{3/2}$ bond content of 83 mol %, based on the total number of silicon atoms, and an (—OH group)/(Ph group+Me group) ratio was 1/16. The solubility in toluene was not less than 100 g/100 ml.

In the above polymer, the chloro group on the silicon atom had been eliminated as a result of hydrolysis in the step of washing with water and there was substantially no residual one in the molecule. Therefore, the above (—OH group)/(Ph group+Me group) ratio corresponds to the (crosslinking substituent/noncrosslinking substituent) ratio of that polymer. The same shall apply in the subsequent production examples as well.

PRODUCTION EXAMPLE 2

Production of Flame Retardant (S-2) to be Added to Resins

Phenyltrichlorosilane (162.4 g, 0.81 mol) and diphenyldichlorosilane (205.1 gm 0.81 mol) were added dropwise to a pyridine solution (1 L) containing boric acid (100 g, 1.62 mol) with ice cooling, and the reaction was allowed to proceed under reflux for 5 hours. Then, trimethylchlorosilane (176 g, 1.62 mol) was added, and the mixture was further refluxed for 3 hours and then the reaction was completed. The reaction mixture was neutralized with 2 N hydrochloric acid and extracted with diethyl ether (500 mL). The solution obtained was dried over anhydrous sodium sulfate, and the solvent was distilled off under vacuum to give the desired compound. GPC analysis gave the following molecular weight data: Mn=6450, Mw=8925 (on the polystyrene equivalent basis; UV detector). NMR analysis-revealed a $Me_3$—Si—$O_{1/2}$ bond content of 14 mol %, a Ph—Si—$O_{3/2}$ bond content of 51 mol % and $Ph_2$—Si—$O_{2/2}$ bond content of 35 mol %, based on the total number of silicon atoms, the —OH group content was below the detection limit of NMR. The solubility in toluene was not less than 100 g/100 ml.

PRODUCTION EXAMPLE 3

Production of Flame Retardant (S-3) to be Added to Resins

Phenyltrichlorosilane (257 g, 1.22 mol) and methylphenyldichlorosilane (77.4 g, 0.40 mol) were added dropwise to a pyridine solution (1 L) containing boric acid (100 g, 1.62 mol) with ice cooling and, after completion of the dripping, the reaction was allowed to proceed with heating under reflux for 5 hours. Then, trimethylchlorosilane (176 g, 1.62 mol) was added,-and the reaction was further allowed to proceed under reflux for 1 hour. Water was then added in excess, the reaction was further allowed to proceed under reflux for 1 hour and the reaction was then completed. The reaction mixture was neutralized with 2 N hydrochloric acid and extracted with diethyl ether (500 mL). The solution obtained was dried over anhydrous sodium sulfate, and the solvent was distilled off under vacuum to give a compound. GPC analysis gave the molecular weight data Mw=18000 (on the polystyrene equivalent basis; UV detector; solvent: toluene). NMR analysis revealed a $Me_3$—Si—$O_{1/2}$ bond content of 9 mol %, a PhMe—Si—$O_{2/2}$ content of 22 mol % and a Ph—Si—$O_{3/2}$ bond content of 69 mol %, and an (—OH group)/(Ph group+Me group) ratio of 1/21. The solubility in toluene was not less than 100 g/100 ml.

PRODUCTION EXAMPLE 4

Production of Flame Retardant (S-4) to be Added to Resins

Phenyltrichlorosilane (342.7 g, 1.62 mol) was added dropwise to a pyridine solution (2 L) containing boric acid (100 g, 1.62 mol) with ice cooling, and the reaction was allowed to proceed under reflux for 5 hours. Then, water was added in excess, the reaction was further allowed to proceed under reflux for 1 hour. Then, trimethylchlorosilane (17.6 g, 0.162 mol) was added and the reaction was allowed to proceed under reflux for 3 hours and then was completed. The reaction mixture was neutralized with 2 N hydrochloric acid and extracted with diethyl ether (500 mL). The solution obtained was dried over anhydrous sodium sulfate, and the solvent was distilled off under vacuum to give a compound. GPC analysis gave the molecular weight data Mw=20000 (on the polystyrene equivalent basis; UV detector; solvent: toluene). NMR analysis revealed a $Me_3$—Si—$O_{1/2}$ bond content of 7 mol % and a Ph—Si—$O_{3/2}$ content of 93 mol %, based on the total number of silicon atoms, and an (—OH group)/(Ph group+Me group) ratio of $\frac{2}{3}$. The solubility in toluene was not less than 100 g/100 ml.

PRODUCTION EXAMPLE 5

Production of Flame Retardant (S-5) to be Added to Resins

Phenyltrichlorosilane (342.7 g, 1.62 mol) was added dropwise to a pyridine solution (1 L) containing boric acid (100 g, 1.62 mol) with ice cooling and, after completion of the dripping, the mixture was heated to 300° C. and the reaction was allowed to proceed while distilling off the solvent. Then, trimethylchlorosilane (176 g, 1.62 mol) was added and the reaction was allowed to proceed with heating for 3 hours and, after cooling, the reaction was allowed to proceed for further 1 hour while adding water, and the reaction was then completed. The product obtained was insoluble in toluene, so that it was impossible to determine the molecular weights by GPC analysis. NMR analysis revealed a $Me_3$—Si—$O_{1/2}$ bond content of 1 mol % and a Ph—Si—$O_{3/2}$ content of 99 mol %, based on the total number of silicon atoms, and an (—OH group)/(Ph group+ Me group) ratio of $\frac{1}{15}$. It was insoluble in toluene.

REFERENCE PRODUCTION EXAMPLE 1

Production of Silicone Compound (Si-1)

Phenyltrichlorosilane (342.7 g, 1.62 mol) was dissolved in methyl isobutyl ketone (1 L) and 500 ml of pure water was added dropwise under cooling with dry ice-methanol over 6 hours. The reaction was then allowed to proceed at ordinary temperature for 1 hour. Then, trimethylchlorosilane (176 g, 1.62 mol) was added and the mixture was refluxed for 1 hour to complete the reaction. Thereafter, washing with pure water was repeated until the washings became neutral. Removal of the solvent by distillation under vacuum gave the desired silsesquioxane compound. GPC analysis gave the result: weight average molecular weight=3500 (on the polystyrene equivalent basis; UV detector; solvent: toluene). NMR analysis revealed a $Me_3$—Si—$O_{1/2}$ bond content of 10 mol % and a Ph—Si—$O_{3/2}$ content of 90 mol %, based on the total number of silicon atoms; the —OH group content was below the detection limit of NMR. The solubility in toluene was not less than 100 g/100 ml.

REFERENCE PRODUCTION EXAMPLE 2

Production of Flame Retardant (S-X) to be Added to Resins

Dimethyldichlorosilane (209.1 g, 1.62 mol) was added dropwise to a pyridine solution (1 L) containing boric acid (50 g, 0.81 mol) with ice cooling, and the reaction was allowed to proceed under reflux for 5 hours. Then, trimethylchlorosilane (17.6 g, 0.16 mol) was added, and the reaction was further allowed to proceed under reflux for 3 hours and the reaction was then completed. The reaction mixture was neutralized with 2 N hydrochloric acid and extracted with diethyl ether (500 mL). The solution obtained was dried over anhydrous sodium sulfate, and the solvent was distilled off under vacuum to give a compound. GPC analysis gave the molecular weight data Mn=2480 and Mw=3650 (on the polystyrene equivalent basis; UV detector). NMR analysis revealed a $Me_2$—Si—$O_{2/2}$ bond content of 91 mol % and a $Me_3$—Si—$O_{1/2}$ content of 9 mol %, based on the total number of silicon atoms.

EXAMPLE 1

Resin Composition Preparation 100 weight parts of a bisphenol A-based polycarbonate resin (PC) with a viscosity average molecular weight of about 22000, 5 weight parts of the flame retardant (S-1) to be added to resins as produced in Production Example 1, 0.1 weight part each of Asekastab HP-10 and AO-60 (both trademarks; products of Asahi Denka) as a phosphorus-containing stabilizer and phenolic stabilizer, respectively, and 0.2 weight part of Polyflon FA-500 (trademark; product of Daikin Industries) as tetrafluoroethylene were dry-blended in advance and then the blend was fed to the hopper of a vented twin-screw extruder [TEX 44 (trademark); product of Japan Steel Works] with the cylinder temperature set at 270° C. and melted and extruded to give a resin composition.

Test Specimen Preparation

The pellets obtained were dried at 120° C. for 5 hours and then molded into bars (12 mm in width, 127 mm in length) with a thickness of 0.9 mm, 1.6 mm, 2.2 mm or 3.2 mm using a 35 t injection molding machine at a cylinder temperature of 270° C. and a mold temperature of 50° C. The specimens thus prepared were evaluated as mentioned below. The results are shown in Table 1.

Evaluation Method

Flame retardancy: According to the standard UL-94, the bars, 0.9 mm, 1.6 mm and/or 2.2 mm in thickness, were evaluated for flame retardancy by the test V. The total burning time is the sum of burning times for five samples tested by the test V according to the UL-94 standard.

Impact resistance: The 3.2-mm-thick bars with a notch at 23° C. were evaluated by the Izod type impact test according to ASTM D 256.

Appearance of moldings: The test specimens obtained were evaluated by the eye for transparency, surface smoothness and so on.

EXAMPLES 2 to 7 AND COMPARATIVE EXAMPLES 1 TO 4

Resin compositions were obtained in the same manner as in Example 1 except that the flame retardants specified in Table 1 or Table 2 were used at the addition amounts specified in Table 1 or Table 2. Test specimens were prepared from the thus-obtained pellets in the same manner as mentioned above. These test specimens were subjected to the above methods of evaluation. The evaluation results are shown in Table 1 and Table 2.

TABLE 1

|  |  | Example | | | | | Comparative Example | | | |
|---|---|---|---|---|---|---|---|---|---|---|
|  |  | 1 | 2 | 3 | 4 | 5 | 1 | 2 | 3 | 4 |
| Resin (PC) |  | 100 | 100 | 100 | 100 | 100 | 100 | 100 | 100 | 100 |
| Flame retardant | S-1 | 5 | 3 | 10 | — | — | — | — | — | 100 |
|  | S-2 | — | — | — | 5 | — | — | — | — | — |
|  | S-3 | — | — | — | — | 5 | — | — | — | — |
|  | Si-1 | — | — | — | — | — | — | 5 | — | — |
|  | S-X | — | — | — | — | — | — | — | 5 | — |
| Flame retardancy 1.6 mm | Total burning time (sec) | 6 | 30 | 1 | 22 | 15 | 255 | 75 | 96 | Could not be molded |
|  | Judgment | V-0 | V-0 | V-0 | V-0 | V-0 | Out of spec | V-1 | V-1 | — |
| 0.9 mm | Total burning time (sec) | 29 | 40 | 4 | 38 | 38 | Unmeasurable | Unmeasurable | Unmeasurable | — |
|  | Judgment | V-0 | V-0 | V-0 | V-0 | V-0 | Out of spec | Out of spec | Out of spec | — |
| Appearance of moldings (by the eye) |  | Transparent | Transparent | Transparent | Translucent | Transparent | Transparent | Opaque | Translucent | — |
| Impact strength (J/m) |  | 700 | 720 | 680 | 650 | 730 | 750 | 650 | 140 | — |

As shown in Table 1, even the thin test specimens showed very good flame retardancy as well as good impact strength, and the moldings were transparent or translucent in appearance in all the examples whereas, in Comparative Example 1 where no flame retardant was used, the flame retardancy was inferior. In Comparative Example 2 where a silicone polymer different from those of the invention was used as the flame retardant of the thin test specimens, in particular, were inferior in flame retardancy and, in addition, the moldings were opaque. In Comparative Example 3 where a compound out of the scope of the invention was used as the flame retardant, it is seen that the flame retardancy, impact resistance and the like were at lowered amounts. In Comparative Example 4, the addition amount of the flame retardant was out of the scope of the invention, so that it was difficult to mold the resin composition.

TABLE 2

|  |  | Example | | Compar. Ex. |
|---|---|---|---|---|
|  |  | 6 | 7 | 1 |
| Resin (PC) |  | 100 | 100 | 100 |
| Flame retardant | S-4 | 5 | — | — |
|  | S-5 | — | 5 | — |
| Flame retardancy 2.2 mm | Total burning time | 20 | 32 | 95 |
|  | Judgment | V-0 | V-0 | V-1 |

EXAMPLES 8 to 15 AND COMPARATIVE EXAMPLES 5 TO 12

Resin compositions were obtained in the same manner as in Example 1 except that the following were used as resins and the resins and flame retardants were compounded in the proportions shown in Table 3 or 4.
PET: Polyethylene terephthalate resin with a logarithmic viscosity number of 0.70;
PBT: Polybutylene terephthalate resin with a logarithmic viscosity number of 1.20;
PPE: Poly(2,6-dimethyl-1,4-phenylene) ether resin with a logarithmic viscosity number of 0.50;
HIPS: Estyrene HI H-53 (trademark; product of Nippon Steel Chemical) which is a butadiene-styrene copolymer resin;
ABS: Kaneka MUH E-1300 (trademark; product of KANEKA CORPORATION) which is an acrylonitrile-butadiene-styrene copolymer resin;
PMI: IP Polymer MS-NA (trademark; product of Denki Kagaku Kogyo) which is a styrene-N-phenylmaleimide-maleic anhydride copolymer resin.

TABLE 3

|  |  | Example | | | | Comparative Example | | | |
|---|---|---|---|---|---|---|---|---|---|
|  |  | 8 | 9 | 10 | 11 | 5 | 6 | 7 | 8 |
| Resin | PC | 80 | 80 | 80 | — | 75 | 80 | 80 | — |
|  | PET | 20 | — | — | — | 25 | — | — | — |
|  | PBT | — | 20 | — | 100 | — | 20 | — | 100 |
|  | ABS | — | — | 20 | — | — | — | 20 | — |
| Flame retardant (S-1) |  | 6 | 8 | 10 | 20 | — | — | — | — |
| Flame retardancy 1.6 mm |  | V-0 | V-0 | V-0 | V-0 | Out of spec | Out of spec | Out of spec | Out of spec |

TABLE 4

|  |  | Example | | | | Comparative Example | | | |
|---|---|---|---|---|---|---|---|---|---|
|  |  | 12 | 13 | 14 | 15 | 9 | 10 | 11 | 12 |
| Resin | PC | 80 | — | — | — | 80 | — | — | — |
|  | PMI | 20 | 80 | — | — | 20 | 80 | — | — |
|  | ABS | — | 20 | — | — | — | 20 | — | — |
|  | PPE | — | — | 80 | 50 | — | — | 80 | 50 |
|  | HIPS | — | — | 20 | 50 | — | — | 20 | 50 |
| Flame retardant (S-1) |  | 6 | 15 | 12 | 20 | — | — | — | — |
| Flame retardancy 1.6 mm |  | V-0 | V-0 | V-0 | V-0 | Out of spec | Out of spec | Out of spec | Out of spec |

As shown in Tables 3 and 4, the addition of the flame retardant of the invention resulted in improvements in flame retardancy in each example.

INDUSTRIAL APPLICABILITY

The flame retardant of the invention shows very good retardant properties at a low addition amount without using the conventional flame retardants containing chlorine, bromine, phosphorus or nitrogen, among others. It seldom impairs the characteristics intrinsic in resins themselves. It has flame retardant effects against various resins and can be synthesized relatively easily using inexpensive raw materials. Such flame retardant is very useful from the industrial viewpoint.

What is claimed is:

1. A flame retardant
   which comprises a polymer comprising silicon, boron and oxygen, having a skeleton substantially formed by a silicon-oxygen bond and a boron-oxygen bond and having an aromatic ring within the molecule.

2. The flame retardant according to claim 1,
   wherein the skeleton of said polymer substantially comprise an Si—O—Si bond, an Si—O—B bond and a B—O—B bond
   and the aromatic ring within the molecule is directly bonded to a silicon atom.

3. The flame retardant according to claim 1 or 2,
   wherein said polymer is a three-dimensionally crosslinking polymer containing, in the skeleton thereof, an $SiRO_{3/2}$ unit and a $BO_{3/2}$ unit,
   in which R represents a univalent substituent capable of being bonded to a silicon atom and the plurality of R groups may be the same or different and at least one of the plurality of R groups is a univalent organic group having an aromatic ring.

4. The flame retardant according to claim 3,
   wherein said polymer contains, in the skeleton thereof, an $SiR_3O_{1/2}$ unit,
   in which R represents a univalent substituent capable of being bonded to a silicon atom and the plurality of R groups may be the same or different and at least one of the plurality of R groups within the polymer is a univalent organic group having an aromatic ring.

5. The flame retardant according to claim 1 or 2,
   wherein said polymer is a three-dimensionally crosslinking polymer containing, in the skeleton thereof, an $SiR_3O_{1/2}$ unit and a $BO_{3/2}$ unit,
   in which R represents a univalent substituent capable of being bonded to a silicon atom and the plurality of R groups may be the same or different and at least one of the plurality of R groups within the polymer is a univalent organic group having an aromatic ring.

6. The flame retardant according to claim 1 or 2,
   wherein said polymer contains no crosslinking substituent within the molecule or, when it contains a crosslinking substituent within the molecule, the ratio of crosslinking substituent and a noncrosslinking substituent (crosslinking substituent/noncrosslinking substituent) ratio among the substituents on silicon atoms and boron atoms in the polymer in less than ¼.

7. The flame retardant according to claim 1 or 2,
   wherein said polymer has the following structure within the molecule:

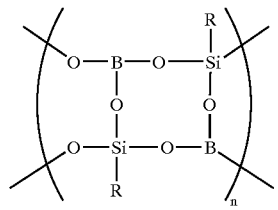

in which R represents a univalent substituent capable of being bonded to a silicon atom and the plurality of R groups may be the same or different and at least one of the plurality or R groups is a univalent organic group having an aromatic ring and n represents a number not less than 1.

8. The flame retardant according to claim 1 or 2,
   wherein said polymer has a weight average molecular weight of not less than 1,000 and not lower than 1 g of said polymer is dissolved per 100 ml of the solvent toluene.

9. The flame retarding according to claim 1 or 2,
   wherein said polymer is obtainable
   by mixing one or more boron compounds with one or more silicon compounds represented by $SiR''X_3$,
   in which R" represents a univalent organic group, X represents one or more selected from among halogen atoms, a hydroxyl group and hydroxyl-derived dehydration condensation products and the plurality of X may be the same or different,
   subjecting the mixture to polymerization,
   then adding one or more silicon compounds represented by $SiR''_3X$, in which R" and X are as defined above,
   and allowing the reaction to proceed.

10. A flame retardant resin composition
    which contains 100 parts by weight of a resin and 0.1 to 50 parts by weight of the flame retardant according to claim 1 or 2.

11. The flame retardant resin composition according to claim 10,
    wherein the resin is an aromatic resin.

12. The flame retardant resin composition according to claim 11,
    wherein the resin comprises at least one resin selected from the group consisting of aromatic polycarbonate resins, aromatic-polyester resins, polyphenylene ether resins, aromatic vinyl resins, polyphenylene sulfide resins, N-aromatic substituted maleimide resins and aromatic polyimide resins.

* * * * *